(12) United States Patent
Kozlowski

(10) Patent No.: US 8,925,204 B2
(45) Date of Patent: Jan. 6, 2015

(54) CONSTANT VELOCITY JOINT AND METHOD OF MAKING

(71) Applicant: Steering Solutions IP Holding Corporation, Saginaw, MI (US)

(72) Inventor: Keith A. Kozlowski, Lynn Haven, FL (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 77 days.

(21) Appl. No.: 13/708,131

(22) Filed: Dec. 7, 2012

(65) Prior Publication Data

US 2013/0097867 A1 Apr. 25, 2013

Related U.S. Application Data

(62) Division of application No. 12/723,150, filed on Mar. 12, 2010, now Pat. No. 8,348,773.

(60) Provisional application No. 61/160,089, filed on Mar. 13, 2009.

(51) Int. Cl.
*B21K 1/04* (2006.01)
*B21K 1/06* (2006.01)
*F16D 3/221* (2006.01)

(52) U.S. Cl.
CPC ............ *F16D 3/221* (2013.01); *F16D 2250/00* (2013.01)
USPC .................. 29/898.063; 29/898.066; 464/141; 464/143

(58) Field of Classification Search
CPC .............. F16C 3/02; F16C 3/22; F16C 3/221; F16C 3/223
USPC .............. 29/898.063, 898.066; 464/141, 906, 464/144, 145, 175, 182
See application file for complete search history.

(56) References Cited

U.S. PATENT DOCUMENTS 1,103,716 A 7/1914 Wallbillich
1,763,206 A 6/1930 Woveris
(Continued)

FOREIGN PATENT DOCUMENTS

FR 1218118 A 5/1960
GB 1596837 9/1981
WO 8809445 A1 12/1988

OTHER PUBLICATIONS

E.R. Wagner, P.E.—Saginaw Steering Gear Div., GMC, "Double Offset Universal Joint" (End Motion Type), Section 3.2.13, pp. 167-170. 1979.

(Continued)

*Primary Examiner* — Alexander P Taousakis
(74) *Attorney, Agent, or Firm* — Cantor Colburn LLP

(57) ABSTRACT

A method of making a CV joint is disclosed. The method includes forming a first rotatable shaft having a first longitudinal axis, the first shaft comprising an axle portion having on one end thereof an enlarged pocket end. The method also includes forming a plurality of inwardly extending bores into the enlarged pocket end along peripherally spaced, radially extending pocket axes to a bore depth. The method further includes forming a plurality of inwardly extending ball pockets that are disposed about the pocket axes to a pocket depth, wherein the bore depth is greater than the pocket depth, thereby forming a recessed lubricant reservoir.

18 Claims, 5 Drawing Sheets

(56) References Cited

U.S. PATENT DOCUMENTS

| | | | | |
|---|---|---|---|---|
| 2,322,570 A | * | 6/1943 | Dodge | 464/144 |
| 3,296,830 A | | 1/1967 | Runkle | |
| 3,367,139 A | * | 2/1968 | Ristau | 464/144 |
| 4,019,347 A | | 4/1977 | Krude | |
| 4,224,808 A | | 9/1980 | Gehrke | |
| 4,377,385 A | * | 3/1983 | Sindelar | 464/142 |
| 4,472,159 A | | 9/1984 | Krude | |
| 4,556,400 A | | 12/1985 | Krude et al. | |
| 4,611,373 A | * | 9/1986 | Hazebrook | 29/898.066 |
| 4,685,897 A | | 8/1987 | Krude | |
| 4,753,626 A | | 6/1988 | Hazebrook et al. | |
| RE32,830 E | * | 1/1989 | Hazebrook | 29/898.066 |
| 4,832,657 A | | 5/1989 | Hahn | |
| 5,230,659 A | | 7/1993 | Bird et al. | |
| RE34,341 E | | 8/1993 | Fukumura et al. | |
| 5,267,905 A | | 12/1993 | Wenzel et al. | |
| 6,135,891 A | * | 10/2000 | Sone et al. | 464/145 |
| 6,264,568 B1 | | 7/2001 | Frazer et al. | |
| 6,280,338 B1 | * | 8/2001 | Hayama et al. | 464/146 |
| 6,537,045 B2 | | 3/2003 | Riegger et al. | |
| 6,685,571 B1 | | 2/2004 | Smith | |
| 6,796,906 B2 | * | 9/2004 | Cermak | 464/145 |
| 6,910,970 B2 | | 6/2005 | Kobayashi | |
| 7,624,819 B1 | | 12/2009 | LeBlanc et al. | |
| 7,637,818 B2 | * | 12/2009 | Jacob et al. | 464/145 |
| 7,674,183 B2 | * | 3/2010 | Lutz et al. | 464/145 |
| 7,690,999 B2 | | 4/2010 | Nozaki et al. | |
| 7,785,205 B2 | * | 8/2010 | Hayama | 464/144 |
| 8,162,766 B2 | * | 4/2012 | Kura et al. | 464/145 |
| 8,172,689 B2 | * | 5/2012 | Kobayashi et al. | 464/15 |
| 8,251,828 B2 | * | 8/2012 | Kozlowski | 464/141 |
| 8,292,749 B2 | * | 10/2012 | Hoshino et al. | 464/145 |
| 8,388,456 B2 | * | 3/2013 | Yamazaki et al. | 464/145 |
| 8,555,508 B2 | * | 10/2013 | Szentmihalyi et al. | 29/898.066 |
| 2002/0032064 A1 | * | 3/2002 | Sone et al. | 464/145 |
| 2005/0272510 A1 | | 12/2005 | Nakagawa et al. | |
| 2007/0161428 A1 | | 7/2007 | Nakao et al. | |
| 2008/0254903 A1 | * | 10/2008 | Jacob et al. | 464/144 |
| 2009/0156319 A1 | * | 6/2009 | Mondragon et al. | 464/141 |
| 2010/0069165 A1 | * | 3/2010 | Jacob et al. | 464/145 |
| 2013/0095932 A1 | * | 4/2013 | Suzuki et al. | 464/150 |

OTHER PUBLICATIONS

E.R. Wagner, P.E., "Basic Requirements for Constant Velocity Universal Joints" Universal Joint and Driveshaft Design Manual, AE-7, Society of Automotive Engineers, Inc., Warrendale, PA pp. 99-101, TJ1079, S62 1979.

* cited by examiner

CONSTANT VELOCITY JOINT AND METHOD OF MAKING

CROSS-REFERENCES TO RELATED APPLICATIONS

This patent application claims priority to U.S. Non-Provisional patent application Ser. No. 12/723,150, filed on Mar. 12, 2010, and U.S. Provisional Patent Application Ser. No. 61/160,089 filed on Mar. 13, 2009, and which are incorporated herein by reference in their entirety.

FIELD OF THE INVENTION

The subject invention generally relates to universal joints, and more particularly to constant velocity (CV) joints, and even more particularly, to CV joints having lubricant reservoirs incorporated therein.

BACKGROUND

Constant velocity joints are typically employed in automotive axial drive shafts, and especially in front-wheel-drive vehicles between the transaxle differential and the driving wheel. They are used to transmit torques at various speeds, angles and telescopic positions between a first shaft and second shaft.

There are many types of CV joints. One CV joint configuration includes a rotatable first shaft that has an axle portion and a pocket end disposed at an end of the axle portion. The first shaft is rotatable about a first longitudinal axis. The pocket end is disposed within a joint housing that is disposed on an end of a second shaft. The second shaft is rotatable about a second longitudinal axis. The joint housing includes a plurality of grooves disposed within a central bore and extending along the second longitudinal axis. The pocket end includes a diameter transverse to the first longitudinal axis that is greater than a diameter of the axle portion of the first shaft. The pocket end defines a plurality of semi-spherical pockets that are circumferentially and radially disposed about the first longitudinal axis in a configuration that is complementary relative to the plurality of grooves. As such, the number of pockets is equal to the number of grooves. The CV joint includes a plurality of spherical drive balls with one drive ball rotatably disposed within each pocket and corresponding groove. The pocket end and first shaft are moveable and may be articulated or stroked axially relative to the second shaft. As the CV joint is articulated (i.e., as the second shaft is moved relative to the first shaft by axial stroking or angulation) the drive balls roll back and forth along the grooves and rotate within the pockets.

The drive balls have a spherical shape. The ball pockets have a semi-spherical shape. The radius of curvature of the pockets is generally larger than the radius of curvature of the drive balls. It is generally desirable to have the ball pockets conform closely to the drive balls, and thus to have the radius of curvature of the ball pockets as close to that of the drive balls as possible. Grease is generally disposed within the pockets, between the pockets and the drive balls, and otherwise disposed within the joints so that it is made available to the drive balls. However, as radius of curvature of the ball pockets becomes close to that of the drive balls, the tight conformance of the balls to the pockets make it difficult to provide lubrication between them causing the interface to become starved of lubricant and leading to high friction and concomitant high wear of one or both of the balls or pockets.

Accordingly, there remains a need to provide stroking CV joints of the types described having improved lubrication and methods of making these joints.

SUMMARY OF THE INVENTION

In an exemplary embodiment of the present invention, a CV joint is provided. The CV joint includes a first rotatable shaft having a first longitudinal axis, the first shaft comprising an axle portion having on one end thereof an enlarged pocket end, the pocket end having a plurality of circumferentially and radially spaced ball pockets formed therein. The CV joint also includes a corresponding plurality of spherical balls disposed in the ball pockets. The CV joint further includes a second rotatable shaft having a second longitudinal axis and comprising a joint housing disposed on an end thereof, the joint housing having a central bore with a corresponding plurality of axially extending, circumferentially and radially spaced ball grooves disposed therein about the second longitudinal axis, the joint housing disposed over the pocket end with the corresponding plurality of balls disposed in the ball grooves, thereby forming a joint that is configured to provide a range of angular movement and a range of axial movement of the first shaft relative to the second shaft, each of the plurality of ball pockets having a recessed lubricant reservoir formed therein, the lubricant reservoir having a lubricant disposed therein.

In another exemplary embodiment of the present invention, a method of making a CV joint is provided. The method includes forming a first rotatable shaft having a first longitudinal axis, the first shaft comprising an axle portion having on one end thereof an enlarged pocket end. The method also includes forming a plurality of inwardly extending bores into the enlarged pocket end along peripherally spaced, radially extending pocket axes to a bore depth. The method further includes forming a plurality of inwardly extending ball pockets that are disposed about the pocket axes to a pocket depth, wherein the bore depth is greater than the pocket depth, thereby forming a recessed lubricant reservoir.

In yet another exemplary embodiment of the present invention, a method of making a CV joint is provided. The method includes forming a first rotatable shaft having a first longitudinal axis, the first shaft comprising an axle portion having on one end thereof an enlarged pocket end. The method also includes forming a plurality of inwardly extending ball pockets along peripherally spaced, radially extending pocket axes. The method also includes forming a recessed lubricant reservoir in each of the ball pockets.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
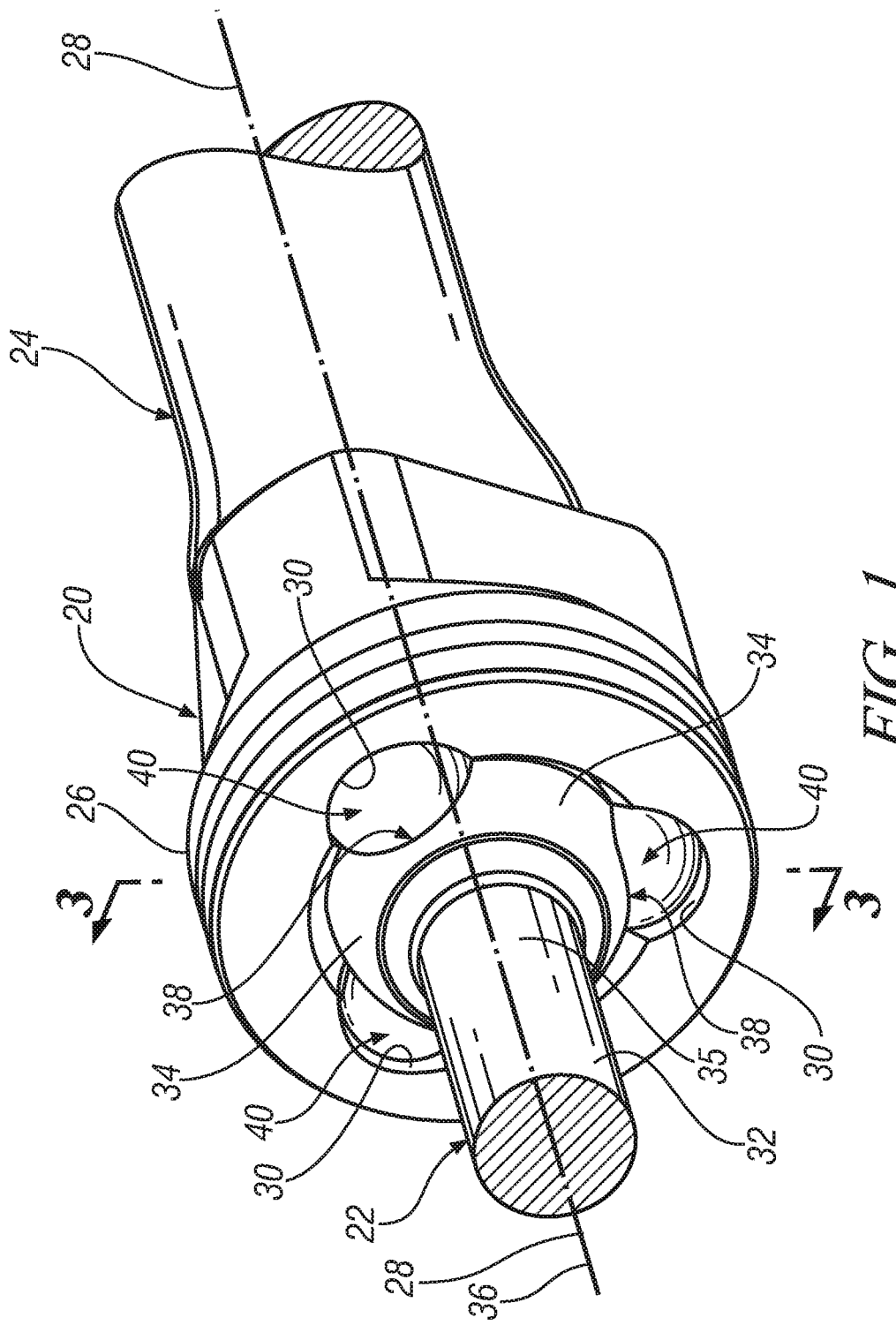
FIG. 1 is a perspective view of an exemplary embodiment of a CV joint as disclosed herein.

The following description is merely exemplary in nature and is not intended to limit the present disclosure, application or uses. It should be understood that throughout the drawings, corresponding reference numerals indicate like or corresponding parts and features.

Referring to the Figures, a CV joint is shown generally at 20. The CV joint 20 is configured to transmit torque between a first end 35 of first shaft 22 and a second shaft 24 at various rotational speeds, joint angles (α) and telescopic axial positions. In an exemplary embodiment, a second CV joint (not shown) may also be coupled to a second end (not shown) of first shaft and configured to transmit torque between first shaft 22 and a third shaft (not shown) at various speeds, angles and telescopic positions. The use of a first shaft 22 that is configured for use with CV joint 20, and may also be configured for use with a second CV joint, may be used in any suitable application requiring transmission of torque along a series of shafts, and is particularly suited for use in automotive axial drive shafts, and is especially useful in the drivetrain of front-wheel-drive vehicles between the transaxle differential and the driving wheels as inboard and outboard CV joints. However, it should be appreciated that the CV joint 20, or a first shaft 22 that includes first CV joint 20 and a second CV joint (not shown), may be utilized in other situations in which a torque must be transmitted between shafts that articulate (i.e., move relative to each other, particularly those where the shafts may be angulated or telescoped, or both, relative to one another). It will also be appreciated that first CV joint 20 and second CV joint may have the same size and joint configuration or a different size and joint configuration. Since the second CV joint may be identical to CV joint 20 and could be illustrated as a mirror image thereof on first shaft 22, the description of CV joint 20 herein is equally applicable to the second CV joint and first shaft 22, and separate illustration has not been provided.

Figure 2:
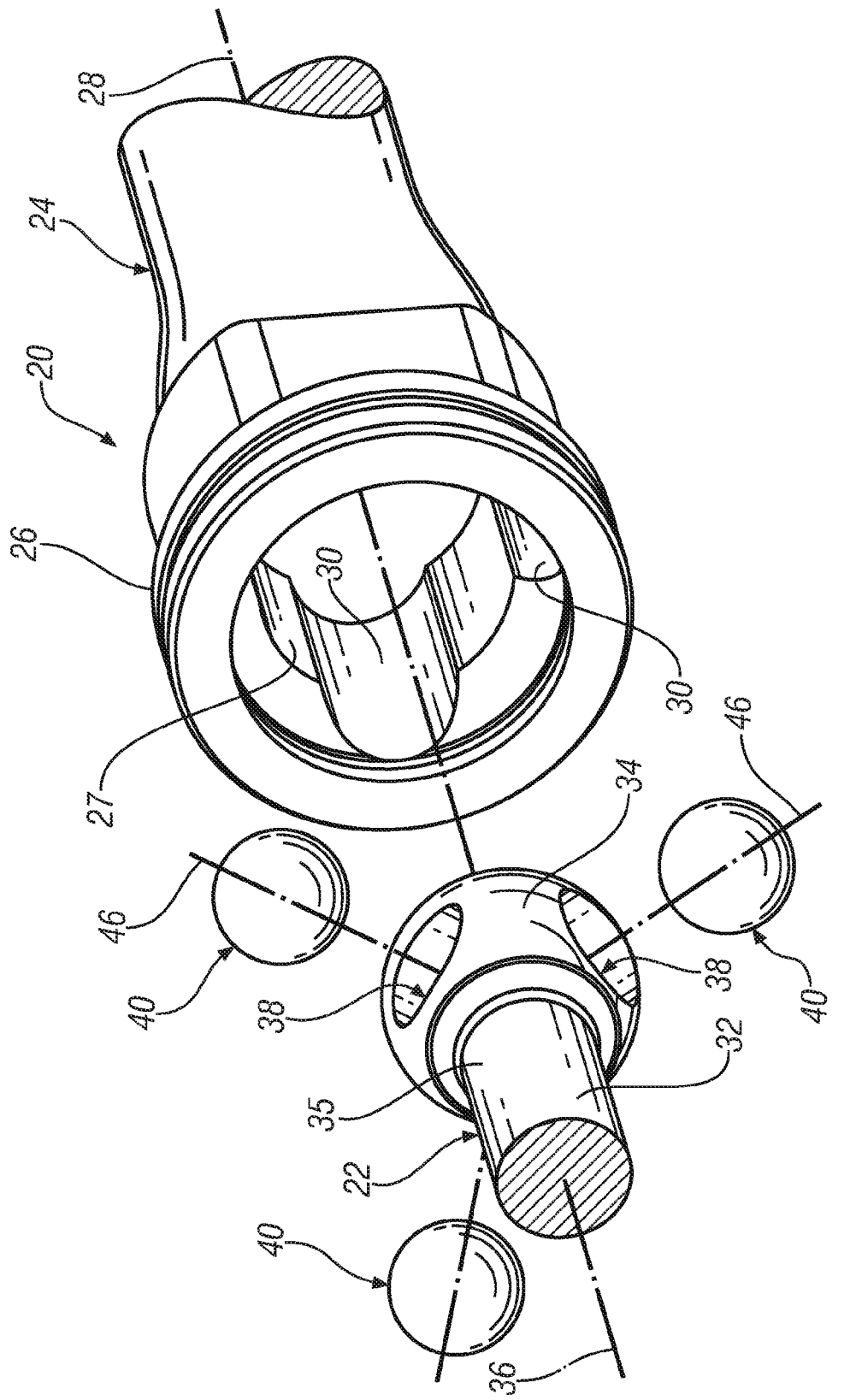
FIG. 2 is a disassembled perspective view of the CV joint of FIG. 1.
Figure 3:
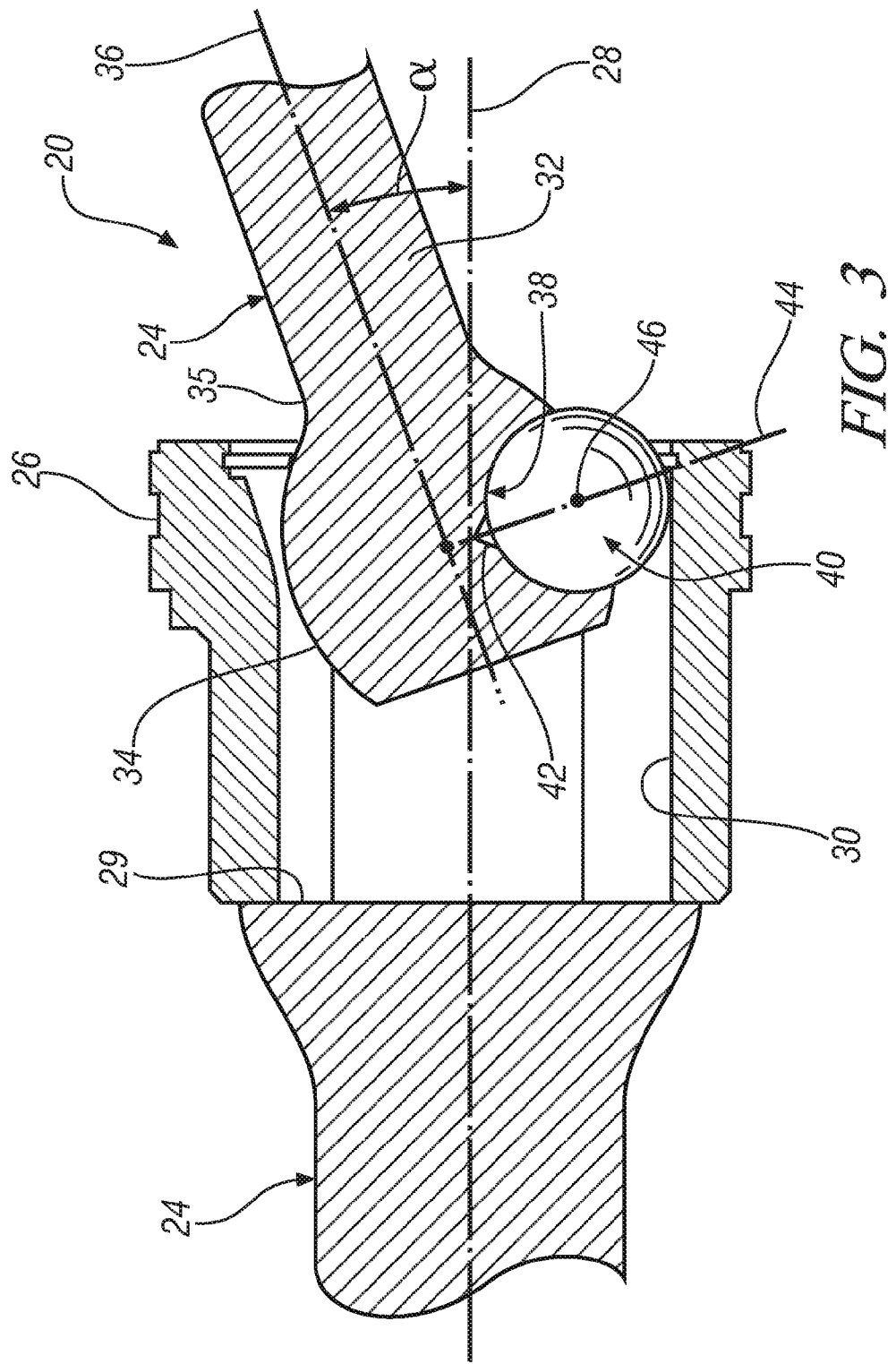
FIG. 3 is a partial cross-sectional view of the CV joint of FIG. 1 taken along Section 3-3 and shown in an articulated configuration.
Figure 4:
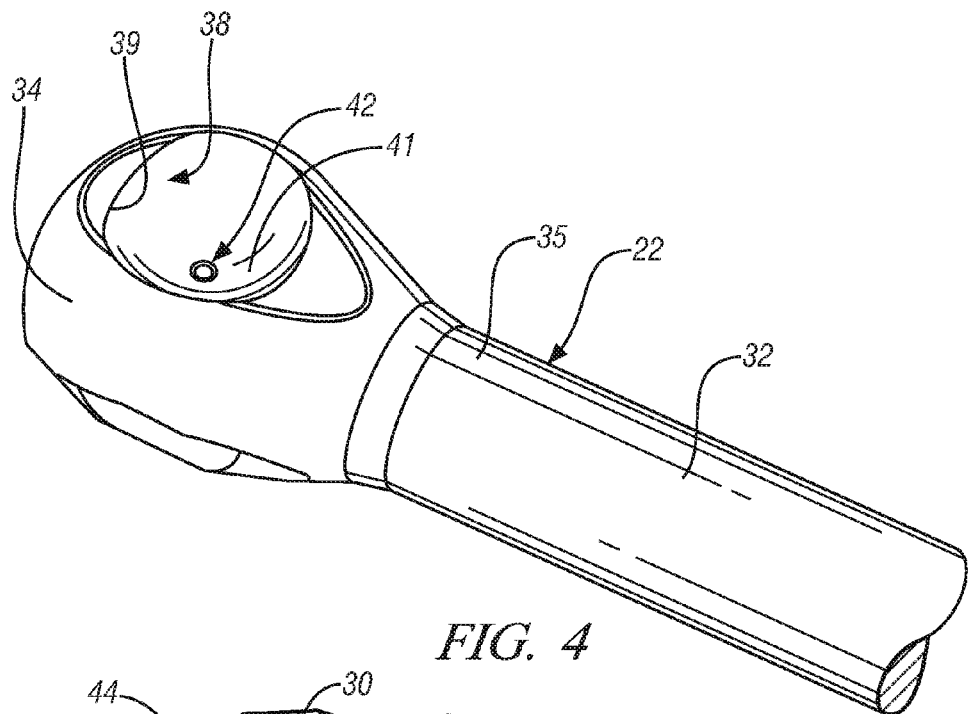
FIG. 4 is a perspective view of an exemplary embodiment of a first shaft as disclosed herein.

As illustrated in FIGS. 1-3, the second shaft 24 includes a joint housing 26 disposed at one end of the second shaft 24. Second shaft 24 may be of any suitable shaft configuration, including solid, hollow and partially hollow shaft configurations. The second shaft 24 is rotatable about a second longitudinal axis 28. The joint housing 26 includes a plurality of radially and circumferentially spaced grooves 30 disposed within a central bore 27 of the joint housing 26. The grooves 30 extend along the second longitudinal axis 28. As shown, the joint housing 26 defines three grooves 30 radially and circumferentially spaced about the second longitudinal axis 28 both radially and circumferentially equidistant from each other (i.e., spaced 120 degrees apart from each other about the second longitudinal axis 28). However, it should be appreciated that the joint housing 26 may define some other number of grooves 30 greater than 3, such as 4, 5, 6, 7, 8 or more grooves 30, if design considerations so require.

The first shaft 22 includes an axle portion 32 and on one end an enlarged pocket end portion, such as pocket end 34 in the exemplary embodiment of FIGS. 1-3. In an exemplary embodiment, the first shaft 22 may also include an enlarged second pocket end portion (not shown) on an opposite end of first shaft 22. First shaft 22 may be of any suitable shaft configuration, including solid, hollow (not shown) and partially hollow (not shown) shaft configurations. The pocket end 34 is disposed proximate an end 35 of the axle portion 32, within the joint housing 26 of the second shaft 24. The pocket end 34 is moveable relative to the second shaft 24; this includes telescoping or axial movement and angular movement through joint angle (α). The first shaft 22 is rotatable about a first longitudinal axis 36. The pocket end 34 defines a plurality of pockets 38 radially and circumferentially disposed about the first longitudinal axis 36 in a complementary orientation relative to the plurality of first grooves 30. As such, the number of pockets 38 is equal to the number of first grooves 30. As shown, the number of pockets 38 is equal to three, with the three pockets 38 radially and circumferentially spaced about the first longitudinal axis 36 equidistant from each other, i.e., the three pockets 38 are radially spaced 120 degrees apart from each other about the first longitudinal axis 36. It should be appreciated that the number of pockets 38 may differ from that shown and described herein, but is equal to the number of grooves 30 defined by the joint housing 26. Furthermore, as the first shaft 22 rotates about the first longitudinal axis 36 and the CV joint 20 articulates (i.e., as the first shaft 22 articulates relative to the second shaft 24, the drive balls 40 roll along the grooves 30 and rotate within the pockets 38).

The CV joint 20 includes a plurality of drive balls 40, with each of the drive balls 40 rotatably disposed within one of the pockets 38 and one of the grooves 30. In other words, each of the drive balls 40 is partially disposed within one of the pockets 38 and partially disposed within one of the grooves 30 opposing the pocket 38. Drive balls 40 may have any suitable configuration. In an exemplary embodiment, drive balls 40 may be spherical and a have a radius of curvature ($r_b$). The drive balls 40 are configured to transmit torque between the second shaft 24 and the first shaft 22 as they move within joint housing 26. This includes rotational movement as the second shaft 24 is rotated about the second longitudinal axis 28 and first shaft 22 is rotated about first longitudinal axis 36. It also includes movement associated with articulation of first shaft 22, second shaft 24 and CV joint 20. As first shaft 22 and second shaft 24 are angulated relative to one another the drive balls 40 are configured to roll along the grooves 30 and rotate within the pockets 38. It also includes telescoping axial movement associated with axial translation of first shaft 22 relative to second shaft 24. As first shaft 22 moves axially relative to second shaft 24, the drive balls 40 are configured to roll along the grooves 30 and rotate within the pockets 38. CV joint 20 is configured to provide any of these movements individually or simultaneously, including simultaneous rotational, angular and axial movement.

The pocket end 34 of the first shaft 22 is radially enlarged relative to the axle portion 32 of the first shaft 22 and may be configured to radially accommodate the pockets 38. Accordingly, the pocket end 34 of the first shaft 22 includes a diameter transverse to the first longitudinal axis 36 that is greater than a diameter of the axle portion 32 of the first shaft 22 transverse to the first longitudinal axis 36. In other words, the pocket end 34 of the first shaft 22 is larger than the axle portion 32 of the first shaft 22. In an exemplary embodiment, pocket end 34 may be partially spherical.

Pockets 38 may have any suitable configuration or shape that allows drive balls 40 to rotate within the pockets in conjunction with movement of CV joint 20 as described herein. In an exemplary embodiment, pockets 38 may be partially or semi-spherical having a radius of curvature ($r_p$). In another exemplary embodiment, the pockets 38 may be partially spherical and have radii of curvature that vary in directions orthogonal to the central axes 44 of pockets 38 and drive balls 40. The central axes 44 pass through the centers 46 of the drive balls 40 and centers of curvature of pockets 38 and orthogonally intersects the second longitudinal axis 36. For example, the radii of curvature of pockets 38 in a direction orthogonal to central axes 44 and parallel to first longitudinal axis 36 may be different than the radii of curvature of pockets 38 in a direction orthogonal to central axes 44 and first longitudinal axis 36. The curvature of pockets 38 may be selected to provide the desired conformity of the pockets 38 to the drive balls 40 and vice versa. In an exemplary embodiment, the radii of the pockets 38 may be selected to be greater than the radii of the respective drive balls 40 with which they are coupled. In another exemplary embodiment, each of the ball pockets 38 may include a non-spherical shape. For example, a portion or arc of a gothic arch that is rotated about central pocket axis 44 may define the non-spherical shape of the ball pockets 36. In another example, a portion or arc of an ellipse rotated about central pocket axis 44 may define the non-spherical shape of the ball pockets 36. In yet another example, a portion or arc of a parabola rotated about central pocket axis 44 may define the non-spherical shape of the ball pockets 36. It should be appreciated that many other non-spherical curved shapes of the pockets 36 may also be defined, including non-spherical curved shapes other than the exemplary shapes described above.

Figure 5:
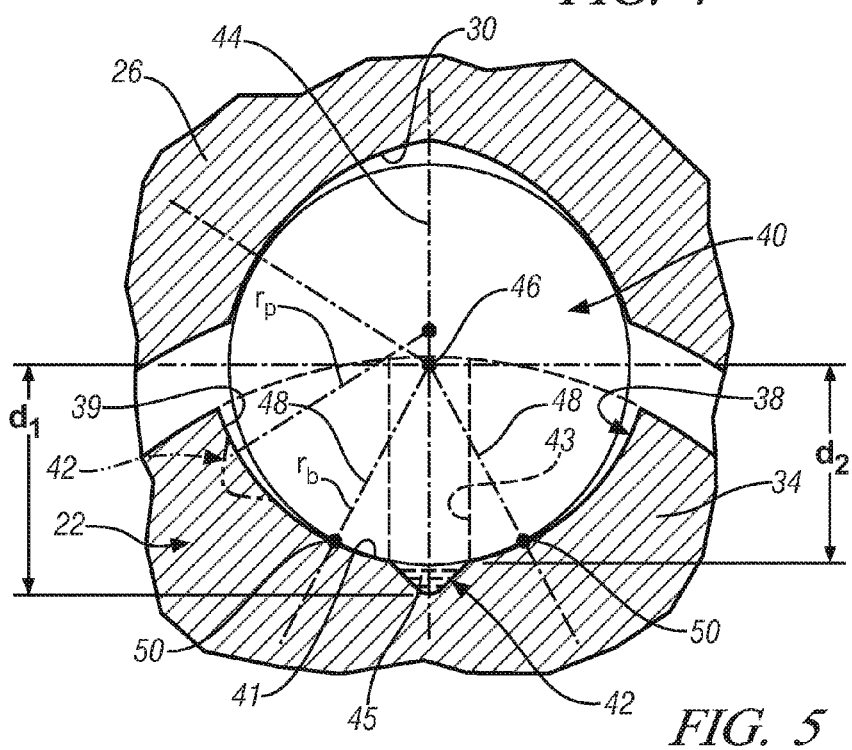
FIG. 5 is a partial cross-sectional view of an exemplary embodiment of a CV joint having a recessed lubricant reservoir as disclosed herein.

As illustrated in FIG. 5, each of the pockets 38 includes at least one recessed lubricant reservoir 42. In an exemplary embodiment, the lubricant reservoir 42 is disposed at a bottom 41 of the pockets 38, along a central axis 44 of the pocket 38. In another exemplary embodiment, the recessed lubricant reservoir 42 is concentric about the central pocket axis 44 at the bottom of pocket 38. However, the recessed lubricant reservoir 42 may be disposed at other desired locations within the pocket 38, including at locations that are offset from the central pocket axis 44. Recessed lubricant reservoir 42 may be located at any desired location within the ball pocket 38, including along the sidewall 39 or at the bottom 41 of the pocket. While ball pocket 38 includes at least one recessed lubricant reservoir 42, a plurality of recessed lubricant reservoirs 42 may be disposed within each ball pocket 38.

Figure 6A:
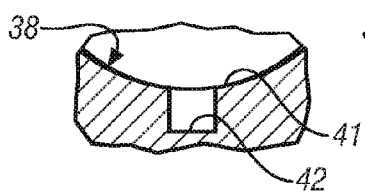
FIGS. 6A-6C are partial cross-sectional views of exemplary embodiments of recessed lubricant reservoirs as disclosed herein.
Figure 6B:
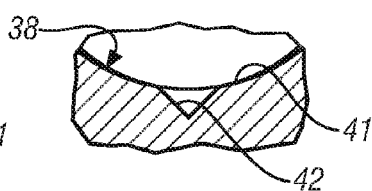
Figure 6C:
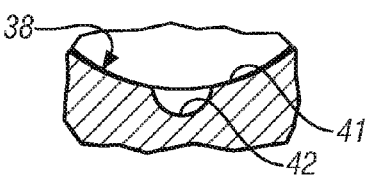

The recessed lubricant reservoir 42 defines a void for storing a lubricant 45, FIG. 5. Any suitable lubricant 45 may be used, including a grease or a mixture of various grease formulations. Accordingly, even with the close conformity between the pockets 38 and the drive balls 40, the interface between the pockets 38 and the drive balls 40 is sufficiently lubricated to avoid starving the bearing surfaces of the drive balls 40 and ball pockets 38 and preserve the proper operation of the CV joint 20. Lubricant reservoir 42 may be filled with lubricant 45 in conjunction with the assembly of CV joint 20. Lubricant reservoir 42 may also act to entrap lubricant 45 as the drive ball 40 rotates within the pocket 38. For example, drive balls 40 may accumulate lubricant 45 that is stored within a boot (not shown) or other device (not shown) used to enclose CV joint 20 on their free surfaces (those surfaces not in contact with pocket 38 or groove 30) and the lubricant 45 may be carried to the lubricant reservoir by the rotation of drive balls 40 within pockets 38. The lubricant reservoir 42 may include any suitable shape and size for storing the lubricant 45 therein. As illustrated in FIGS. 6A-6C, lubricant reservoir 42 may include a cylindrical recess (FIG. 6A), frustoconical recess (FIG. 6B) or semi-spherical recess (FIG. 6C), or a combination thereof. Lubricant reservoir 42 may also have a shape that differs from those shown in the drawings.

The recessed lubricant reservoir 42 is particularly useful in CV joints 20 where the ball pockets 38 are closely conforming to the drive balls 40, including joints where peripherally-spaced, radial central pocket axes 44 pass through the centers of the drive balls 40 and ball pockets 38 and are disposed perpendicularly to the first longitudinal axis 36, and further including joints where each drive ball 40 contacts its respective ball pocket 38 along an annular contact interface (i.e., a circular ring of contact extending around the ball pocket 38). The close conformity of the ball pockets 38 and drive balls 40 possible with CV joint 20 described herein may be illustrated by reference to a conformity ratio. The conformity ratio (C) is defined as the radius of the ball pocket ($r_p$) divided by the radius of the drive ball ($r_b$), or $C=r_p/r_b$. Thus, if the radius of the pocket is equal to the radius of the drive ball, the conformity ratio is equal to 1. The conformity ratio may also be described in terms of two principle conformity ratios, which are in mutually perpendicular planes including the principle radii of curvature of the pocket as described above. The first principle conformity ratio ($C_1$) may be measured along a plane perpendicular to the first longitudinal axis 36. The second principle conformity ratio ($C_2$) may be measured along a plane parallel to the first longitudinal axis 36 oriented to include a line segment 48, FIG. 5, extending from the center 46 of the spherical drive ball 40 to an initial point of contact 50, FIG. 5, between the spherical drive ball 40 and the ball pocket 38. The use of recessed lubricant reservoir 42 enables the use of drive balls 40 and ball pockets 38 that conform closely to one another, including those having first and second conformity ratios of about 1.01 to about 1.04. The use of recessed lubricant reservoir 42 avoids high friction between the drive balls 40 and ball pockets 38 that would otherwise occur in joints having close conformity of the drive balls 40 and ball pockets 38 without the use of the recessed lubricant reservoir 42 and the ability to provide lubricant 45 to the high friction locations of the interface between them, including points of contact or bearing surfaces between them.

Figure 7:
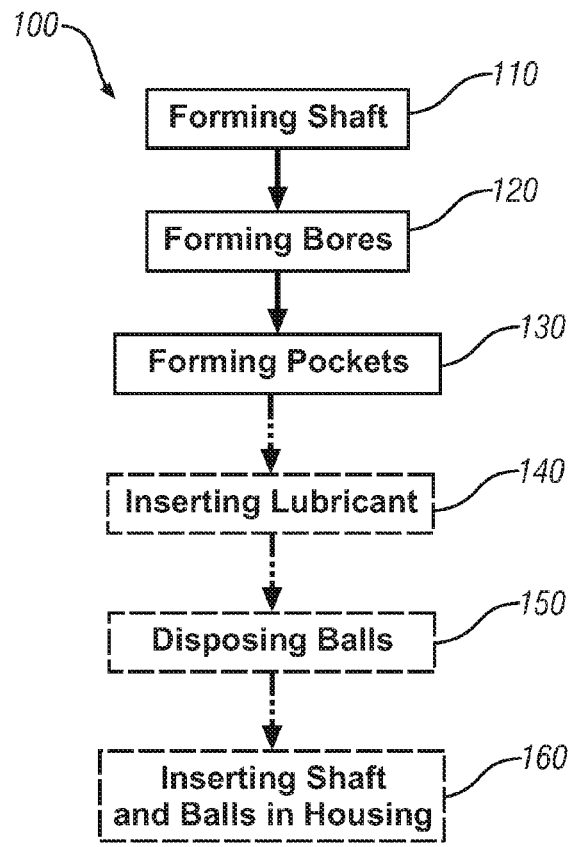
FIG. 7 is a flowchart of an exemplary embodiment of a method of making a CV joint as disclosed herein.

As illustrated in FIG. 7, CV joint 20 may be made by a method 100 that includes forming 110 a first rotatable shaft 22 having a first longitudinal axis 36 and that includes an axle portion 32 having on one end thereof an enlarged pocket end 34. Forming 110 may utilize conventional metal forming processes for forming such a shaft, such as various forms of forging and machining. Method 100 may also include forming 120 a plurality of inwardly extending bores 43, including at an end thereof, lubricant reservoirs 42, into the enlarged pocket portion 34 along peripherally spaced, radially extending central pocket axes 44 to a bore depth ($d_1$), FIG. 5. Method 100 may also include forming 130 a plurality of inwardly extending ball pockets 38 that are disposed about the central pocket axes 44 to a pocket depth ($d_2$), FIG. 5, wherein the bore depth ($d_1$) is greater than the pocket depth ($d_2$), thereby forming a recessed lubricant reservoir 42. Method 100 may be used, for example, as shown in the FIG. 5 to provide a lubricant reservoir 42 that is disposed at the bottom 41 of the pocket 38, concentric with the central pocket axis 44. Disposition of the lubricant reservoir 42 at this position within the pockets 38, permits the lubricant reservoir 42 to be formed using drill point tool to form bores 43 by drilling into the first shaft 22 along the central pocket axis 44. Pockets 38 may then be formed afterward by machining. According to method 100, forming 120 of bores 43 and lubricant reservoirs 42 is done prior to forming 130 of pockets 38. After forming 120 of bores 43 and lubricant reservoirs 42, forming 130 of pockets 38 may be accomplished, such as by machining using a mill. As the lubricant reservoir 42 is formed first at the bottom of the pocket 38, and extends into the pocket end 34 of the first shaft 22 further than the pocket 38, the mill utilized to form the pocket 38 is not required to remove any material at the tip of the mill, as this material has already been removed by the drill point tool during formation of the lubricant reservoir 42. This is advantageous because the speed of the mill forming the pocket 38 is zero at the center of the mill, which makes it difficult for the mill to remove material near its center. By removing the material at the center of the mill by forming bores 43 and lubricant reservoirs 42 first, the efficiency and precision of the mill and thereby the milling process to form the pockets 38 is increased. This also increases the life expectancy of the mill and associated tools.

It should be appreciated that the terms point drill tool and mill should be interpreted broadly to include all suitable machining tools commonly utilized in milling and drilling operations. Accordingly, the method of forming 120 of the bores 43 and recessed lubricant reservoirs 42 and forming the 130 of the pockets 38 within the first shaft 22 described above should be interpreted broadly to include the steps of forming these features with any tool, including, for example, drilling of the pockets 38 and milling of the bores 43 and recessed lubricant reservoirs 42, and should not be understood to restricted forming 120 of the bores 43 or forming 130 of the pockets 38 to any specific type of tool.

Method 100 may also include inserting 140 a lubricant 45, such as a grease, into the lubricant reservoir 42. Method 100 may further include disposing 150 a corresponding plurality of spherical balls in the ball pockets and inserting 160 the first shaft 22 and balls 40 into a joint housing 26 disposed on an end 29 of the second rotatable shaft 24, as described herein. The second rotatable shaft 24 has joint housing 26 having a central bore 27 disposed about second longitudinal axis 28 and a plurality of axially extending, circumferentially and radially spaced ball grooves 30 disposed therein about the second longitudinal axis 28. The joint housing 26 is disposed over the enlarged pocket end 34 with the corresponding plurality of balls 40 disposed in the ball grooves 30, thereby forming a moveable CV joint 20 that is configured to provide a range of angular movement and a range of axial movement of the first shaft 22 relative to the second shaft 24, wherein lubricant 45 is provided from the lubricant reservoirs 42 to the respective balls during movement of the joint.

Figure 8:
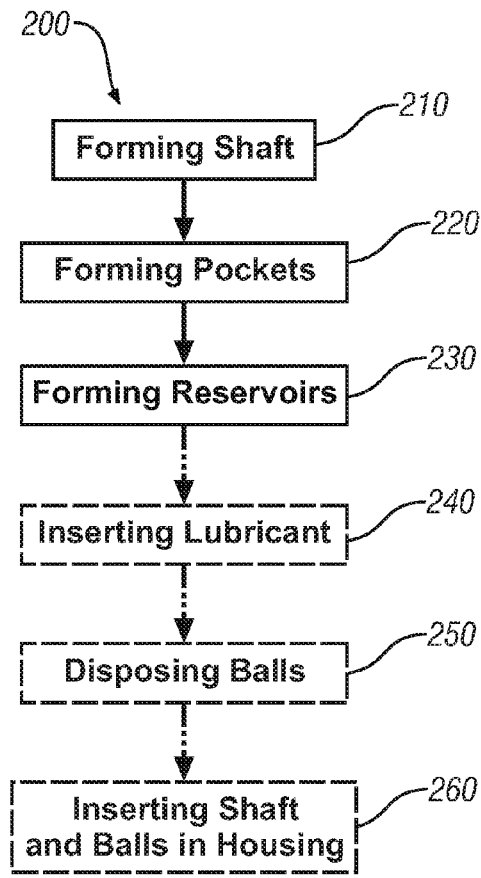
FIG. 8 is a flowchart of a second exemplary embodiment of a method of making a CV joint as disclosed herein.

Alternately, as illustrated in FIG. 8, CV joint 20 may be made by a method 200 that includes forming 210 a first rotatable shaft 22 having a first longitudinal axis 36 and including an axle portion 32 having on one end 35 thereof an enlarged pocket end 34. Method 200 also includes forming 220 a plurality of inwardly extending ball pockets 38 along peripherally spaced, radially extending central pocket axes 44 and forming 230 a recessed lubricant reservoir 42 in each of the ball pockets 38. Method 200 may also include inserting 240 a lubricant 45, such as a grease, into the lubricant reservoir 42. Method 200 may further include disposing 250 a corresponding plurality of spherical balls in the ball pockets and inserting 260 the first shaft 22 and balls 40 into a joint housing 26 disposed on an end 29 of the second rotatable shaft 24, as described herein. The second rotatable shaft 24 has joint housing 26 having a central bore 27 disposed about second longitudinal axis 28 and a plurality of axially extending, circumferentially and radially spaced ball grooves 30 disposed therein about the second longitudinal axis 28. The joint housing 26 is disposed over the enlarged pocket end 34 with the corresponding plurality of balls 40 disposed in the ball grooves 30, thereby forming a moveable CV joint 20 that is configured to provide a range of angular movement and a range of axial movement of the first shaft 22 relative to the second shaft 24, wherein lubricant 45 is provided from the lubricant reservoirs 42 to the respective balls during movement of the joint.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A method of making a constant velocity joint, comprising:
    forming a first rotatable shaft having a first longitudinal axis, the first shaft comprising an axle portion having on one end thereof an enlarged pocket end;
    forming a plurality of inwardly extending bores into the enlarged pocket end along peripherally spaced, radially extending pocket axes to a bore depth; and
    forming a plurality of inwardly extending ball pockets that are disposed about the pocket axes to a pocket depth, each ball pocket defined by a curved sidewall disposed around the respective pocket axis, wherein the bore depth is greater than the pocket depth, thereby forming a blind recessed lubricant reservoir.

2. The method of claim 1, further comprising inserting a lubricant into the lubricant reservoir.

3. The method of claim 2 wherein the lubricant comprises a grease.

4. The method of claim 1, further comprising:
    disposing a corresponding plurality of spherical balls in the ball pockets; and
    inserting the first shaft and balls into a joint housing disposed on an end of a second rotatable shaft having a second longitudinal axis, the joint housing having a central bore with a corresponding plurality of axially extending, circumferentially and radially spaced ball grooves disposed therein about the second longitudinal axis, wherein the joint housing is disposed over the pocket end with the corresponding plurality of balls disposed in the ball grooves, thereby forming a moveable joint that is configured to provide a range of angular movement and a range of axial movement of the first shaft relative to the second shaft, wherein lubricant is provided from the lubricant reservoirs to the respective balls and ball pockets during movement of the joint.

5. The method of claim 1, wherein forming the inwardly extending bore comprises drilling.

6. The method of claim 1, wherein forming the inwardly extending pockets comprises machining.

7. A method of making a constant velocity joint, comprising:
    forming a first rotatable shaft having a first longitudinal axis, the first shaft comprising an axle portion having on one end thereof an enlarged pocket end;
    forming a plurality of inwardly extending ball pockets along peripherally spaced, radially extending pocket axes, each ball pocket defined by a curved sidewall that is disposed around the pocket axis; and forming a bore in each of the ball pockets, the bore comprising a blind recessed lubricant reservoir.

8. The method of claim 7, further comprising inserting a lubricant into the lubricant reservoir.

9. The method of claim 8, wherein the lubricant comprises a grease.

10. The method of claim 8, further comprising:

disposing a corresponding plurality of spherical balls in the ball pockets; and inserting the first shaft and balls into a joint housing disposed on an end of a second rotatable shaft having a second longitudinal axis, the joint housing having a central bore with a corresponding plurality of axially extending, circumferentially and radially spaced ball grooves disposed therein about the second longitudinal axis and a base, wherein the joint housing is disposed over the pocket end with the corresponding plurality of balls disposed in the ball grooves, thereby forming a moveable joint that is configured to provide a range of angular movement and a range of axial movement of the first shaft relative to the second shaft, wherein lubricant is provided from the lubricant reservoirs to the respective balls during movement of the joint.

11. The method of claim 7, wherein forming the lubricant reservoirs comprises drilling and forming the inwardly extending pockets comprises machining.

12. The method of claim 7, wherein each of the plurality of ball pockets comprises a plurality of recessed lubricant reservoirs.

13. The method of claim 7, wherein the recessed lubricant reservoirs are disposed on the pocket axes.

14. The method of claim 7, wherein the recessed lubricant reservoirs are offset from the pocket axes.

15. The method of claim 1, wherein each of the plurality of ball pockets is semi-spherical having a radius of curvature ($r_p$) and each of the spherical balls has a radius of curvature ($r_b$), a conformity ratio (C) is defined by $C=r_p/r_b$, and the conformity ratio of the pockets and balls is about 1.01 to about 1.04.

16. The method of claim 7, wherein each of the plurality of ball pockets has a non-spherical shape.

17. The method of claim 7, wherein the plurality of ball pockets comprises three or more ball pockets.

18. The method of claim 7, wherein the recessed lubricant reservoirs each comprise a cylindrical recess, semi-spherical recess, or frustoconical recess, or a combination thereof.

* * * * *